(12) United States Patent
Pan

(10) Patent No.: US 9,742,230 B2
(45) Date of Patent: Aug. 22, 2017

(54) PERMANENT MAGNET ROTOR

(71) Applicant: Zhongshan Broad-Ocean Motor Manufacturing Co., Ltd., Zhongshan (CN)

(72) Inventor: Mingpan Pan, Zhongshan (CN)

(73) Assignee: Zhongshan Broad-Ocean Motor Manufacturing Co., Ltd., Zhongshan (CN)

( * ) Notice: Subject to any disclaimer, the term of this patent is extended or adjusted under 35 U.S.C. 154(b) by 268 days.

(21) Appl. No.: 14/621,418

(22) Filed: Feb. 13, 2015

(65) Prior Publication Data

US 2015/0162792 A1  Jun. 11, 2015

Related U.S. Application Data

(63) Continuation-in-part of application No. PCT/CN2014/072702, filed on Feb. 28, 2014.

(30) Foreign Application Priority Data

Aug. 30, 2013 (CN) .................... 2013 2 0539733 U

(51) Int. Cl.
 *H02K 1/27* (2006.01)
(52) U.S. Cl.
 CPC ................................ *H02K 1/2773* (2013.01)
(58) Field of Classification Search
 CPC .............................. H02K 21/12; H02K 21/16
 See application file for complete search history.

(56) References Cited

U.S. PATENT DOCUMENTS

| | | | | |
|---|---|---|---|---|
| 4,910,861 A * | 3/1990 | Dohogne | ............... | H02K 1/278 264/272.2 |
| 4,954,736 A * | 9/1990 | Kawamoto | ............ | H02K 1/278 310/156.21 |
| 5,010,266 A * | 4/1991 | Uchida | ................. | H02K 1/2773 310/156.22 |
| 5,091,668 A * | 2/1992 | Cuenot | ................ | H02K 1/2773 310/156.61 |
| 5,939,810 A * | 8/1999 | Uchida | ................. | H02K 1/2773 310/156.57 |
| 6,654,582 B2 * | 11/2003 | Jones | .................. | G03G 15/0921 399/277 |
| 8,564,166 B2 * | 10/2013 | Pan | ......................... | H02K 21/16 310/156.48 |

(Continued)

*Primary Examiner* — Tran Nguyen
(74) *Attorney, Agent, or Firm* — Matthias Scholl P.C.; Matthias Scholl

(57) ABSTRACT

A permanent magnet rotor including a rotor core and permanent magnets. The rotor core includes a plurality of magnetic induction blocks. A plurality of radial recesses are formed between every two adjacent magnetic induction blocks for mounting the permanent magnets. The magnetic induction blocks protrude at both sides of the opening of the radial recesses to form hook blocks. The permanent magnets include a first permanent magnet and a second permanent magnet. The first permanent magnet includes a north pole strong magnetic surface and a south pole weak magnetic surface. The second permanent magnet includes a north pole weak magnetic surface and a south pole strong magnetic surface. The first permanent magnet and the second permanent magnet are alternately disposed in the radial recesses.

10 Claims, 10 Drawing Sheets

(56) References Cited

U.S. PATENT DOCUMENTS

| | | | |
|---|---|---|---|
| 2007/0222320 A1* | 9/2007 | Kowalski | H02K 1/2713 310/156.65 |
| 2013/0038161 A1* | 2/2013 | Pan | H02K 1/2773 310/156.01 |
| 2013/0038162 A1* | 2/2013 | Pan | H02K 21/16 310/156.15 |
| 2013/0038165 A1* | 2/2013 | Pan | H02K 21/16 310/156.48 |

* cited by examiner

PERMANENT MAGNET ROTOR

CROSS-REFERENCE TO RELATED APPLICATIONS

This application is a continuation-in-part of International Patent Application No. PCT/CN2014/072702 with an international filing date of Feb. 28, 2014, designating the United States, and further claims priority benefits to Chinese Patent Application No. 201320539733.3 filed Aug. 30, 2013. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to a permanent magnet rotor.

Description of the Related Art

As shown in FIG. 1, a typical permanent magnet rotor includes a rotor core A1 and permanent magnets A2. The rotor core A1 includes a plurality of magnetic induction blocks A11, and a plurality of radial recesses A12 are formed between every two adjacent magnetic induction blocks A11 for mounting the permanent magnets A2. The magnetic induction blocks A11 at both sides of an opening of the radial recesses protrudes to form hook blocks A13. The permanent magnets A2 are blocks including a north pole magnetic surface and a south pole magnetic surface. Two north pole magnetic surfaces of two adjacent permanent magnets A2 are separately attached to two sides of a same magnetic induction block A11 to form a north magnetic pole 100, and two south pole magnetic surfaces of two adjacent permanent magnets A2 are separately attached to two sides of another same magnetic induction block A11 to form a south magnetic pole 200.

However, in the process of magnetic domain orientation of a magnetic shoe blank, as shown in FIG. 2, when the orientation coil approaches to the permanent magnet A2, the magnetic strength of the magnetic surface close to the orientation coil is relatively strong, and the magnetic strength of the magnetic surface far from the orientation coil is relatively weak. Measurement shows that, the magnetic strength of the strong magnetic surface is at least 5% greater than the magnetic strength of the weak magnetic surface. With regard to an embedded rotor, each magnetic pole of the rotor is formed by two permanent magnets A2 separately attached to two sides of one magnetic induction block A11. If the two magnetic surfaces attached to two sides of the magnetic induction block A11 are both strong or both weak, the resulting magnetic strength is nonuniform.

In production, the nonuniformity of magnetic strength is often ignored, that is to say, the magnetic strength of the north pole magnetic surface and the south pole magnetic surface are regarded to be equivalent. However, the assembled rotor produces violent fluctuation and vibration, thereby producing irregular back electromotive force waveform, and resulting in inaccurate and inefficient control.

FIG. 3 shows two kinds of magnetic poles formed by a first strong magnetic surface and a second strong magnetic surface of permanent magnets, and by a first weak magnetic surface and a second weak magnetic surface of permanent magnets, respectively. FIG. 4 shows three kinds of magnetic poles formed by two strong magnetic surfaces, two weak magnetic surfaces, and a strong magnetic surface and a weak magnetic surface, respectively. The magnetic fields formed in FIGS. 3 and 4 are nonuniform, which is harmful to the operation of the motor. Specifically, the motor produces huge electromagnetic noise and vibration, thereby indirectly causing inaccurate and inefficient control.

SUMMARY OF THE INVENTION

In view of the above-described problems, it is one objective of the invention to provide a permanent magnet rotor that can produce uniformly distributed magnetic field and weaken electromagnetic noise and vibration when the motor is working. In addition, the permanent magnet rotor can speed up the placement of the permanent magnets accurately, and prevent the misplacement thereof, thereby improving the working efficiency.

To achieve the above objective, in accordance with one embodiment of the invention, there is provided a permanent magnet rotor comprising a rotor core and permanent magnets. The rotor core comprises a plurality of magnetic induction blocks, and a plurality of radial recesses are formed between every two adjacent magnetic induction blocks for mounting the permanent magnets. The magnetic induction blocks at both sides of an opening of the radial recesses protrude to form hook blocks. The permanent magnets comprise a first permanent magnet and a second permanent magnet. The first permanent magnet comprises a north pole strong magnetic surface and a south pole weak magnetic surface. The second permanent magnet comprises a north pole weak magnetic surface and a south pole strong magnetic surface. The first permanent magnet and the second permanent magnet are alternately disposed in the radial recesses. The north pole strong magnetic surface of the first permanent magnet and the north pole weak magnetic surface of the second permanent magnet from two adjacent radial recesses are separately attached to two sides of a same magnetic induction block to form a north magnetic pole. The south pole weak magnetic surface of the first permanent magnet and the south pole strong magnetic surface of the second permanent magnet from two adjacent radial recesses are separately attached to two sides of another same magnetic induction block to form a south magnetic pole.

In a class of this embodiment, the first permanent magnet comprises a first short side on a top thereof, and a first marker is disposed on the first short side; the second permanent magnet comprises a second short side on a top thereof, and a second marker is disposed on the second short side.

In a class of this embodiment, the first short side is disposed on the north pole strong magnetic surface; and the second short side is disposed on the south pole strong magnetic surface.

In a class of this embodiment, the first marker and the second marker are alternately disposed uniformly.

In a class of this embodiment, a magnetic strength of the north pole strong magnetic surface of the first permanent magnet is at least 5% higher than that of the south pole weak magnetic surface of the first permanent magnet; and a magnetic strength of the north pole weak magnetic surface of the second permanent magnet is at least 5% less than that of the south pole strong magnetic surface of the first permanent magnet.

In a class of this embodiment, the rotor core and the permanent magnets are connected via an injection layer.

In a class of this embodiment, the injection layer comprises a front end panel, a rear end panel, and a middle connection column connecting the front end panel and the rear end panel.

In a class of this embodiment, the first short side is disposed on the south pole weak magnetic surface; and the second short side is disposed on the north pole weak magnetic surface.

In a class of this embodiment, the first permanent magnet and the first marker, and the second permanent magnet and the second marker, both are integrated.

Advantages according to embodiments of the invention are summarized as follows: 1) The permanent magnets comprises a first permanent magnet and a second permanent magnet. The first permanent magnet comprises a north pole strong magnetic surface and a south pole weak magnetic surface. The second permanent magnet comprises a north pole weak magnetic surface and a south pole strong magnetic surface. The first permanent magnet and the second permanent magnet are alternately disposed in the radial recesses. The north pole strong magnetic surface of the first permanent magnet and the north pole weak magnetic surface of the second permanent magnet from two adjacent radial recesses are separately attached to two sides of a same magnetic induction block to form a north magnetic pole; and the south pole weak magnetic surface of the first permanent magnet and the south pole strong magnetic surface of the second permanent magnet from two adjacent radial recesses are separately attached to two sides of another same magnetic induction block to form a south magnetic pole. Thus, the magnetic strengths of the magnetic poles are basically equivalent, the magnetic distribution is uniform, thereby weakening electromagnetic noise and vibration of the running motor. 2) The first permanent magnet comprises a first short side on the top thereof, and a first marker is disposed on the first short side; the second permanent magnet comprises a second short side on the top thereof, and a second marker is disposed on the second short side, so that the permanent magnets can be disposed accurately and rapidly, the misplacement thereof is prevented, thereby improving the working efficiency.

BRIEF DESCRIPTION OF THE DRAWINGS

The invention is described hereinbelow with reference to the accompanying drawings, in which.

DETAILED DESCRIPTION OF THE EMBODIMENTS

Figure 1:
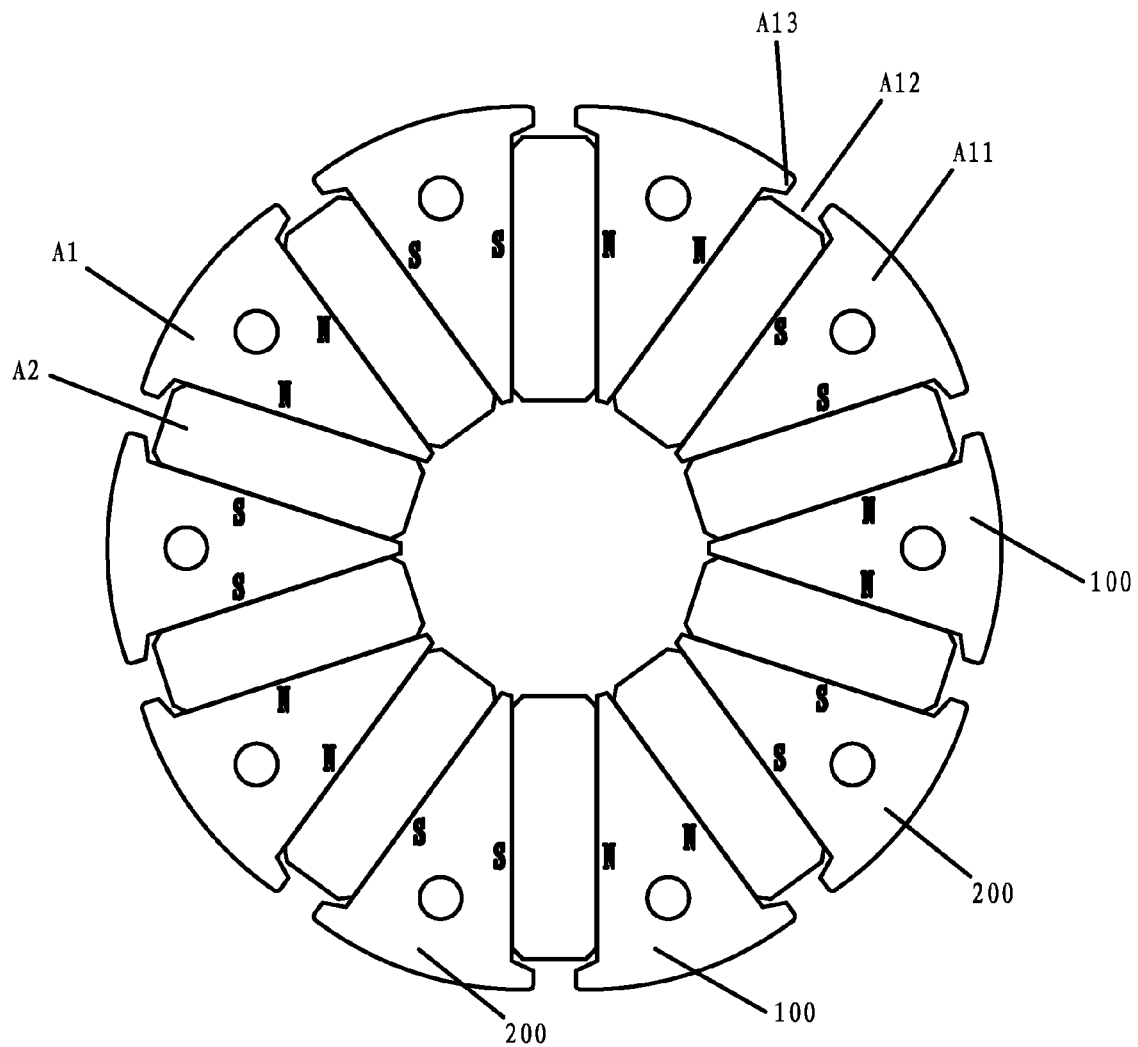
FIG. 1 is a schematic diagram of a permanent magnet rotor in the prior art.
Figure 2:
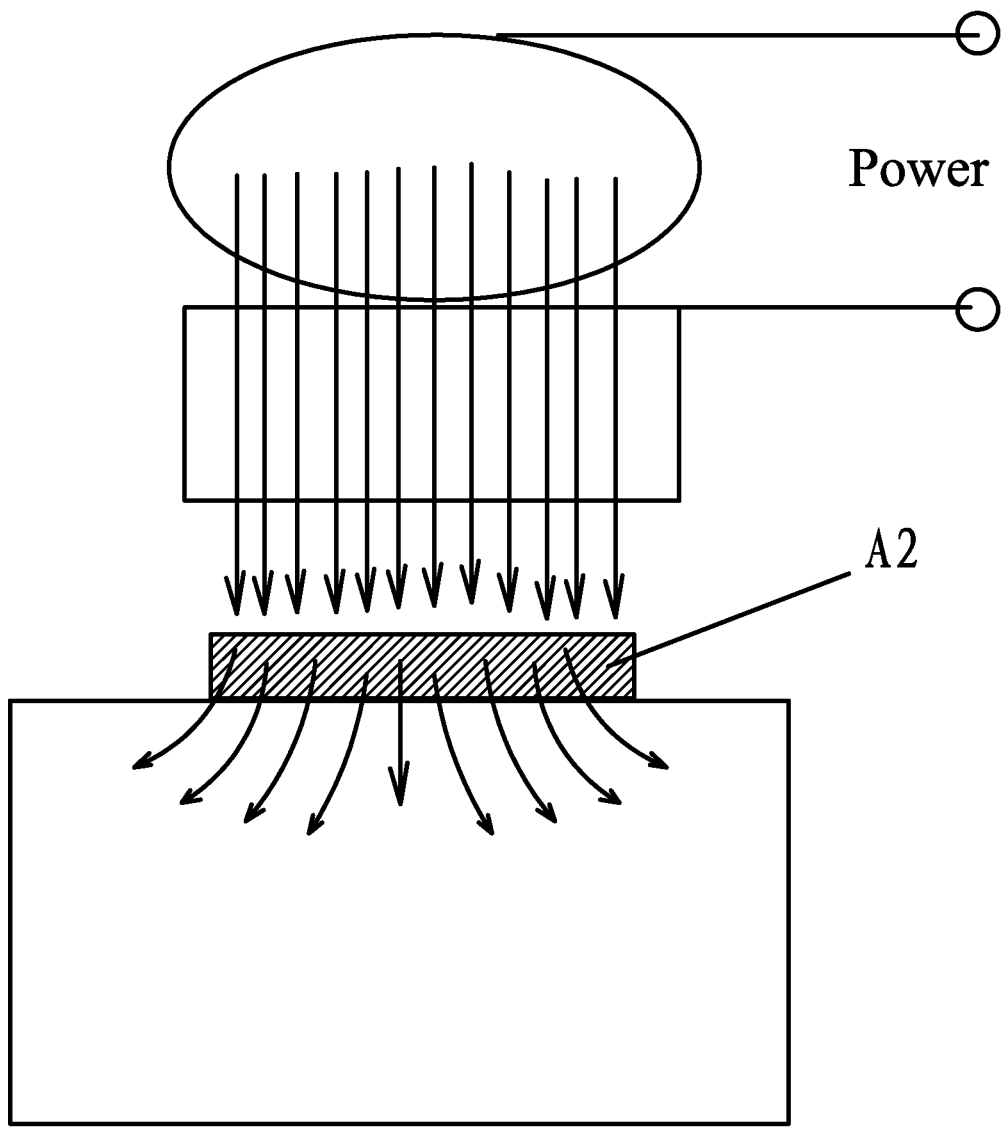
FIG. 2 shows a schematic diagram of magnetic domain orientation of a magnetic shoe blank.
Figure 3:
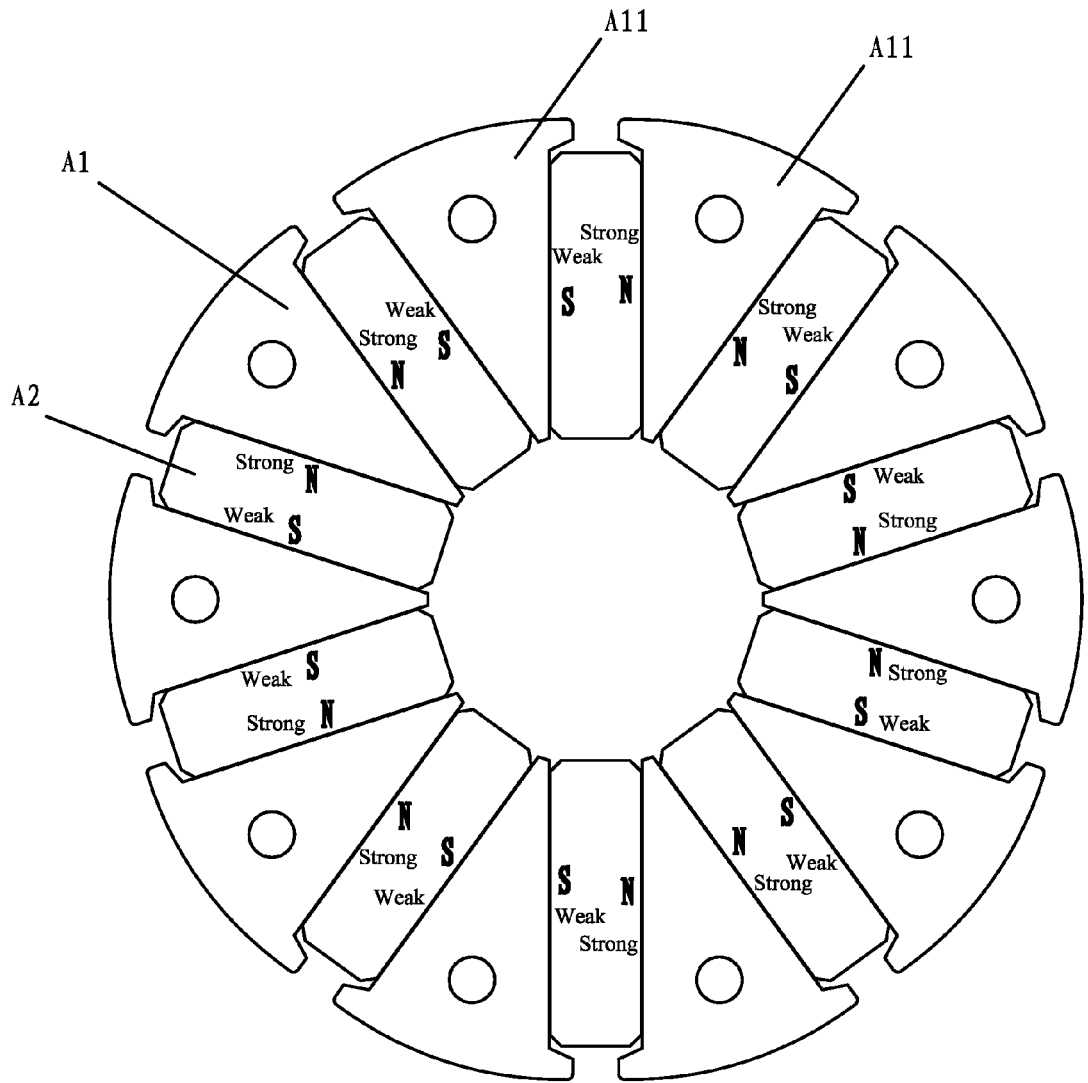
FIG. 3 is a schematic diagram showing magnetic pole distribution of a permanent magnet rotor in the prior art.
Figure 4:
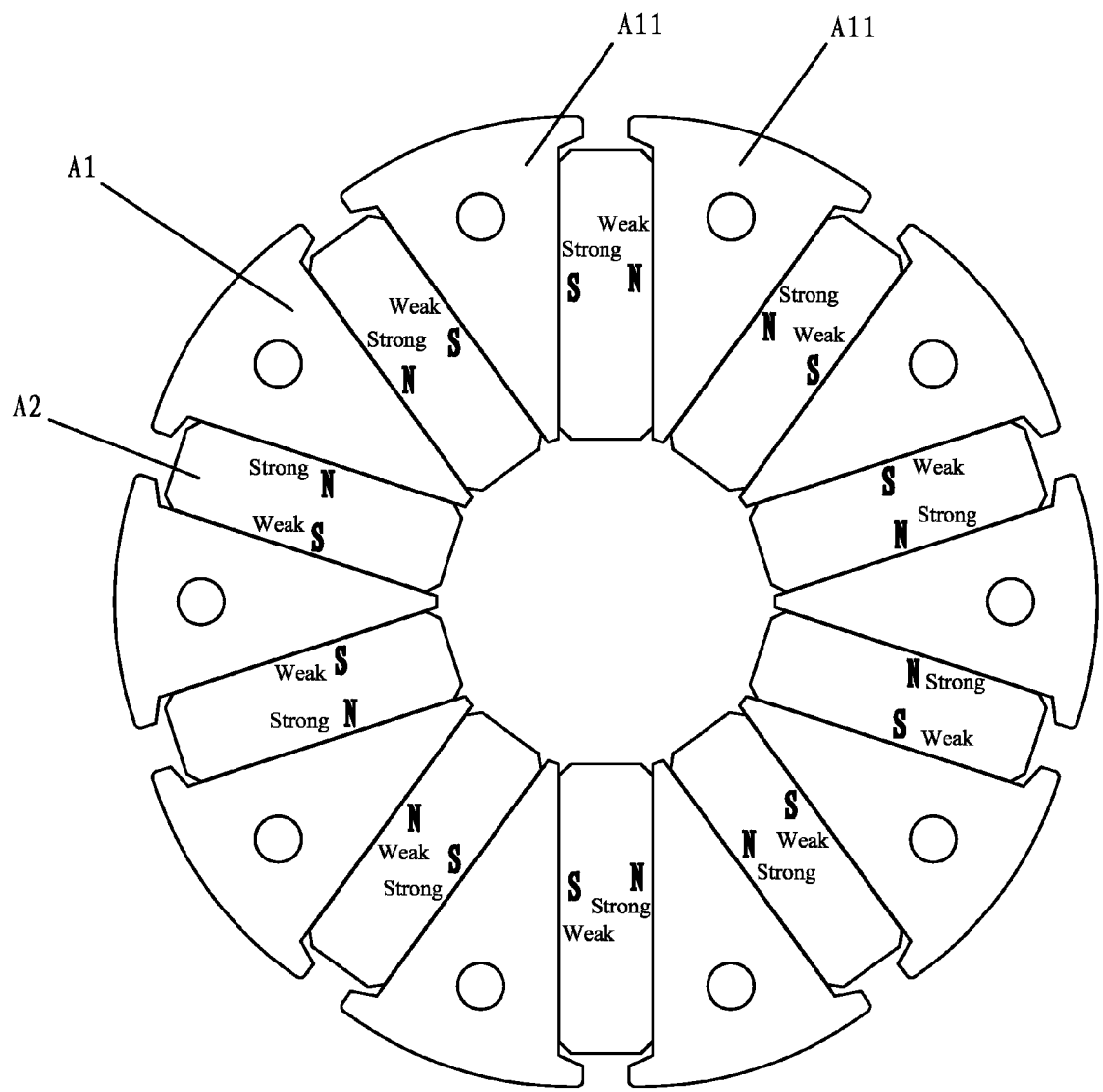
FIG. 4 is a schematic diagram showing magnetic pole distribution of another permanent magnet rotor in the prior art.
Figure 5:
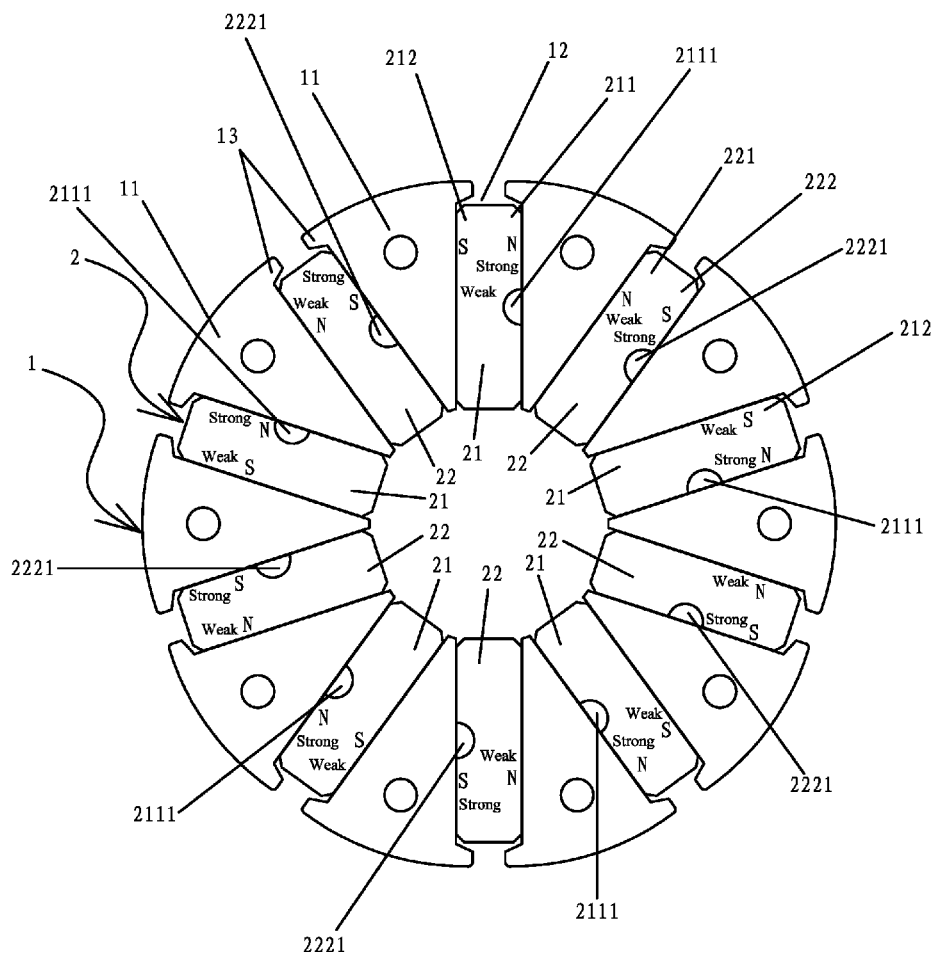
FIG. 5 is a schematic diagram of a permanent magnet rotor in accordance with one embodiment of the invention.
Figure 6:
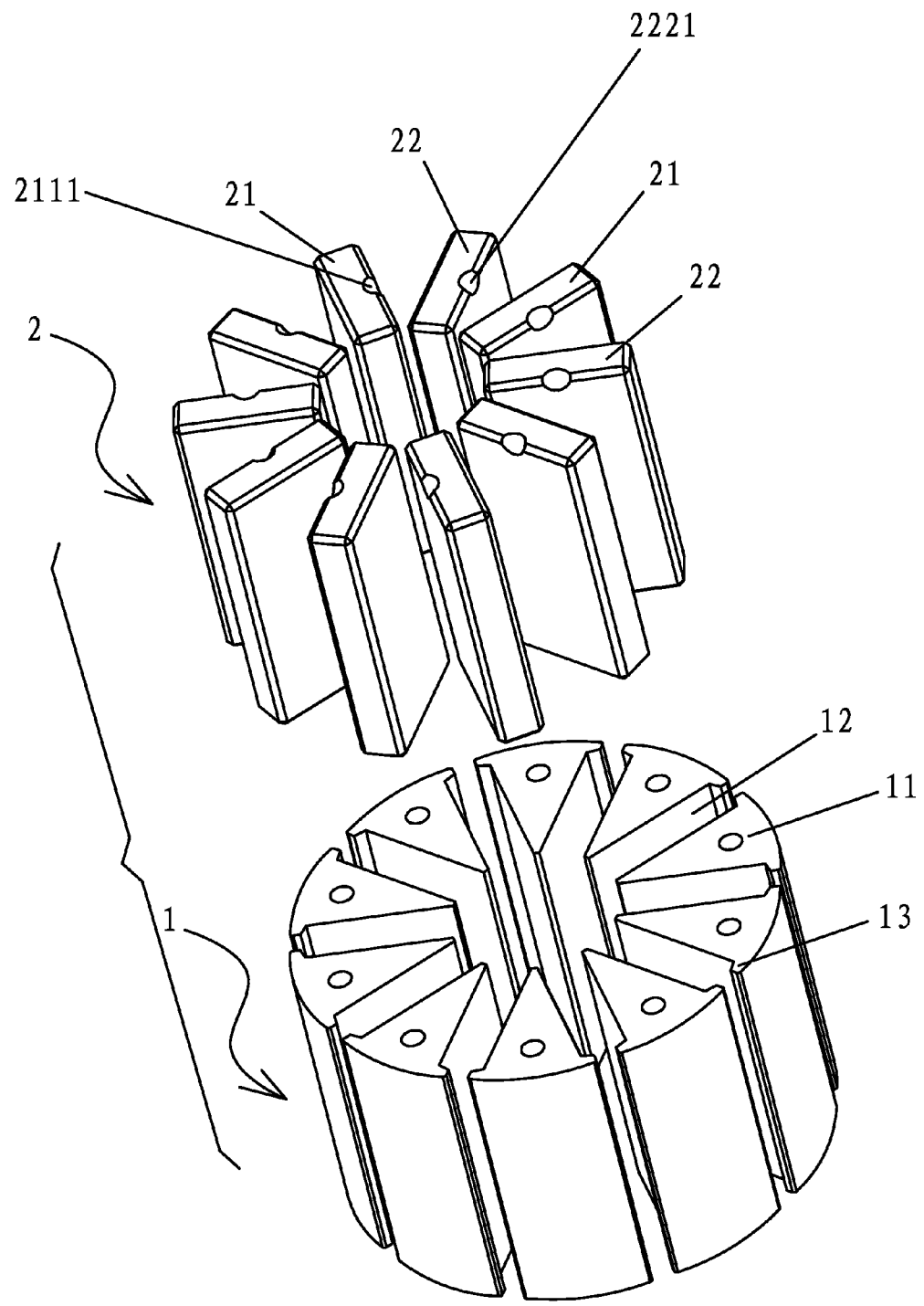
FIG. 6 is an exploded view of a permanent magnet rotor in accordance with one embodiment of the invention.
Figure 7:
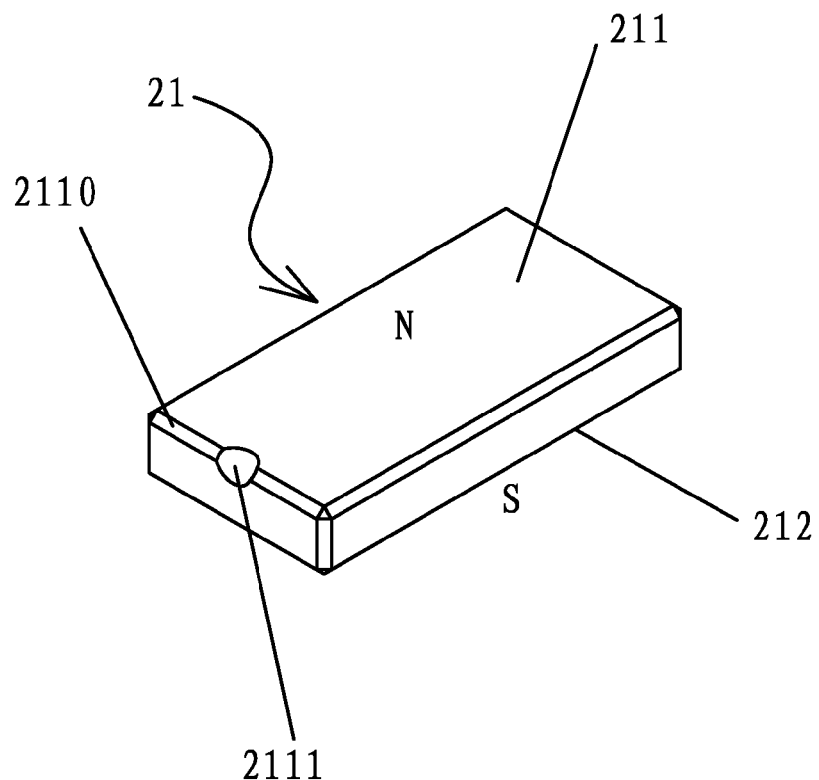
FIG. 7 is a stereogram of a first permanent magnet in accordance with one embodiment of the invention.
Figure 8:
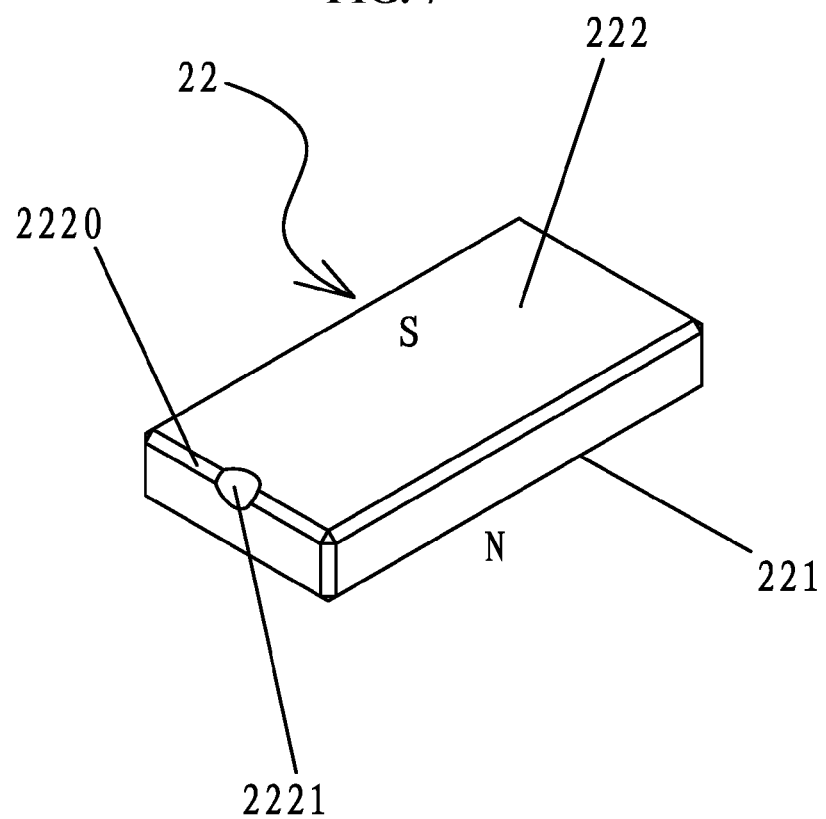
FIG. 8 is a stereogram of a second permanent magnet in accordance with one embodiment of the invention.
Figure 9:
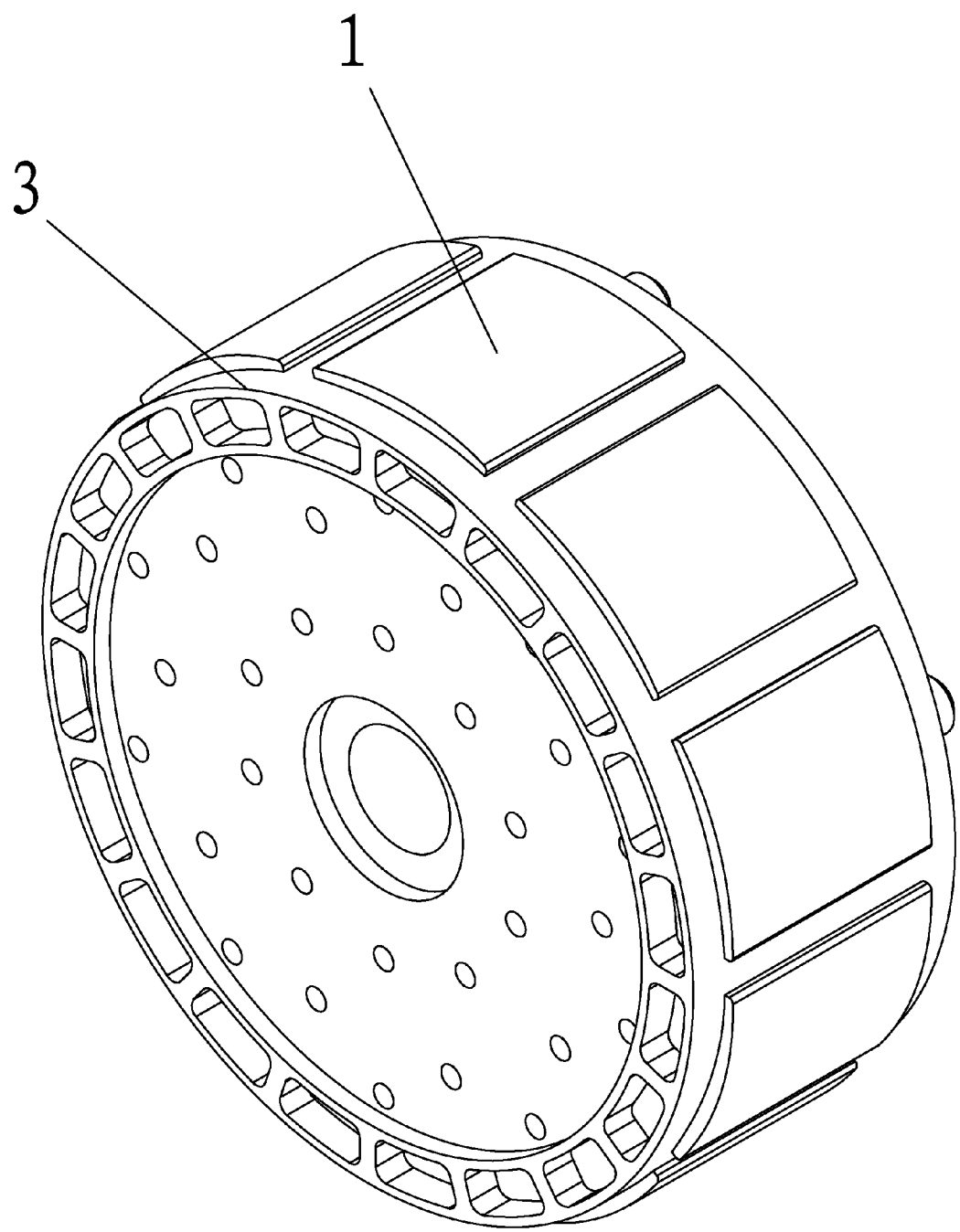
FIG. 9 is a stereogram of an injected permanent magnet rotor in accordance with one embodiment of the invention.
Figure 10:
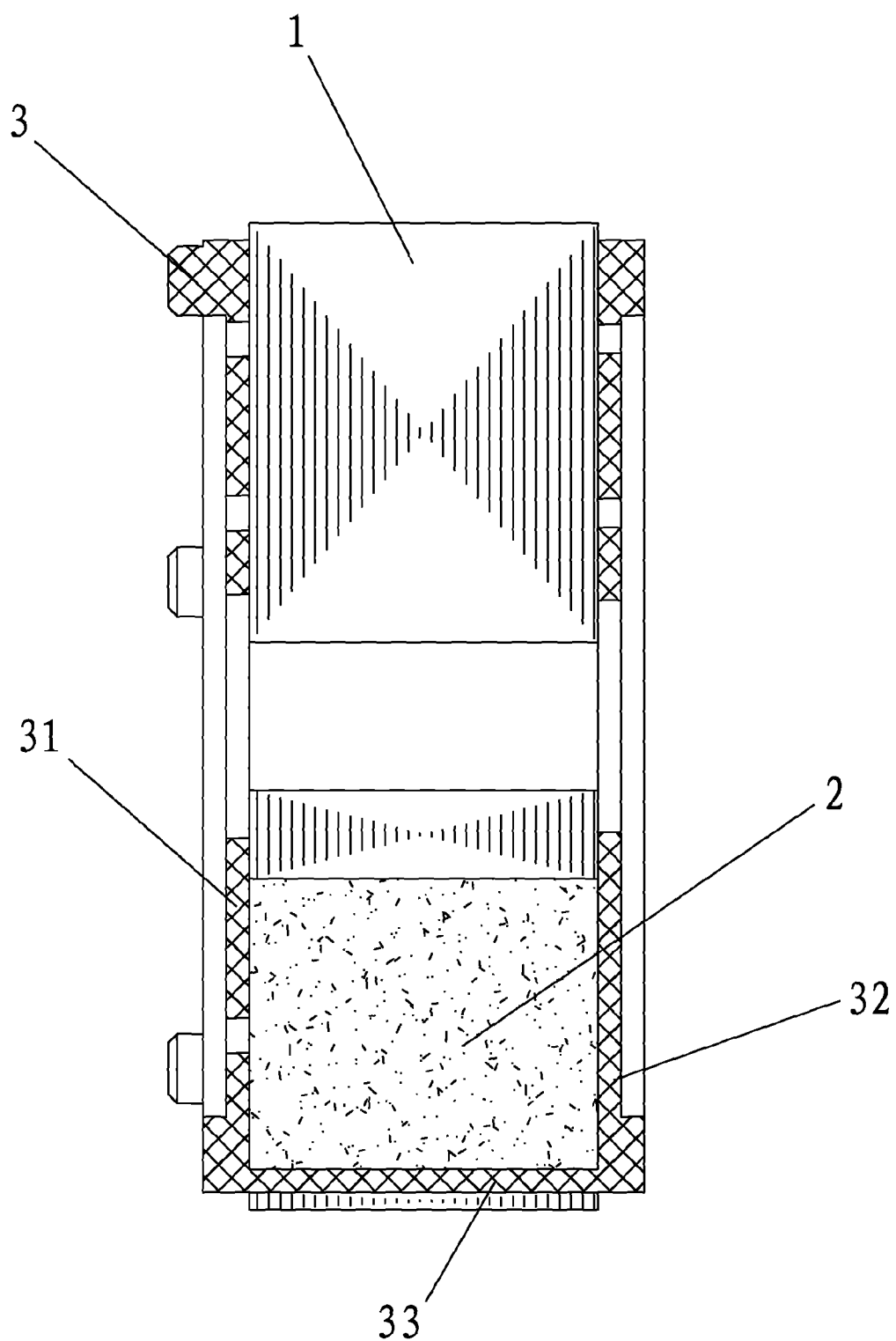
FIG. 10 is an exploded view of an injected permanent magnet rotor in accordance with one embodiment of the invention.

For further illustrating the invention, experiments detailing a permanent magnet rotor are described below. It should be noted that the following examples are intended to describe and not to limit the invention.

Example 1

As shown in FIGS. 5-10, a permanent magnet rotor comprises a rotor core 1 and permanent magnets 2. The rotor core comprises a plurality of magnetic induction blocks 11, and a plurality of radial recesses 12 are formed between every two adjacent magnetic induction blocks for mounting the permanent magnets 2. The magnetic induction blocks 11 at both sides of an opening of the radial recesses protrude to form hook blocks 13. The permanent magnets 2 comprise a first permanent magnet 21 and a second permanent magnet 22. The first permanent magnet 21 comprises a north pole strong magnetic surface 211 and a south pole weak magnetic surface 212. The second permanent magnet 22 comprises a north pole weak magnetic surface 221 and a south pole strong magnetic surface 222. The first permanent magnet 21 and the second permanent magnet 22 are alternately disposed in the radial recesses 122. The north pole strong magnetic surface 211 of the first permanent magnet 21 and the north pole weak magnetic surface 221 of the second permanent magnet 22 from two adjacent radial recesses 12 are separately attached to two sides of a same magnetic induction block 11 to form a north magnetic pole; and the south pole weak magnetic surface 212 of the first permanent magnet 21 and the south pole strong magnetic surface 222 of the second permanent magnet 22 from two adjacent radial recesses 12 are separately attached to two sides of another same magnetic induction block 11 to form a south magnetic pole. The first permanent magnet 21 comprises a first short side 2110 on a top thereof, and a first marker 2111 is disposed on the first short side. The second permanent magnet 22 comprises a second short side 2220 on a top thereof, and a second marker 2221 is disposed on the second short side. The first short side 2110 is disposed on the north pole strong magnetic surface 211; and the second short side 2220 is disposed on the south pole strong magnetic surface 222. From the top view, the first marker 2111 and the second marker 2221 are alternately disposed uniformly. The magnetic strength of the north pole strong magnetic surface 211 of the first permanent magnet 21 is at least 5% higher than that of the south pole weak magnetic surface 212 of the first permanent magnet 21; and the magnetic strength of the north pole weak magnetic surface 221 of the second permanent magnet 22 is at least 5% less than that of the south pole strong magnetic surface 222 of the first permanent magnet 22. The rotor core 1 and the permanent magnets 2 are connected via an injection layer 3. The injection layer 3 comprises a front end panel 31, a rear end panel 32, and a middle connection column 33 connecting the front end panel 31 and the rear end panel 32. The first permanent magnet 21 and the first marker 2111, and the second permanent magnet 22 and the second marker 2221, both are integrated.

Example 2

Figure 11:
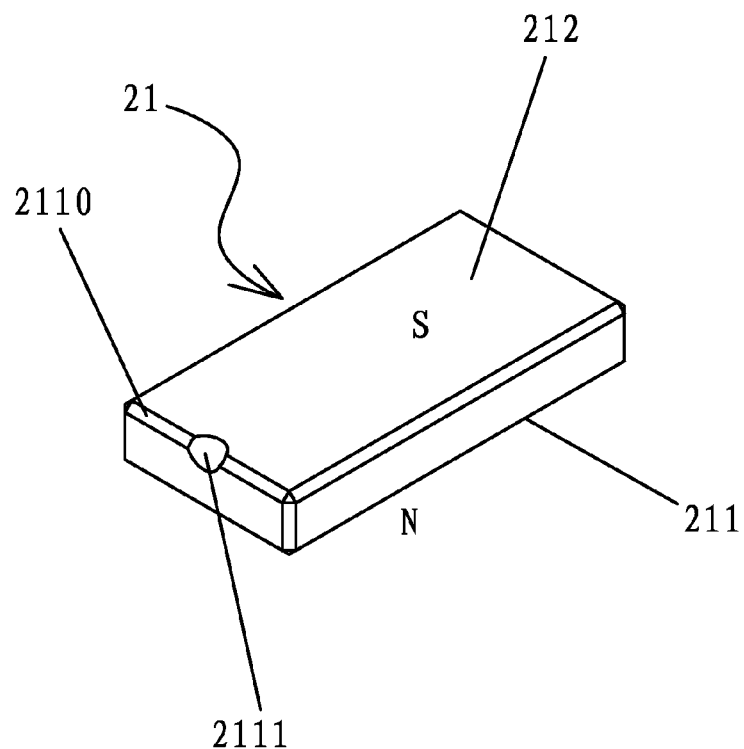
FIG. 11 is a stereogram of a first permanent magnet in accordance with another embodiment of the invention.
Figure 12:
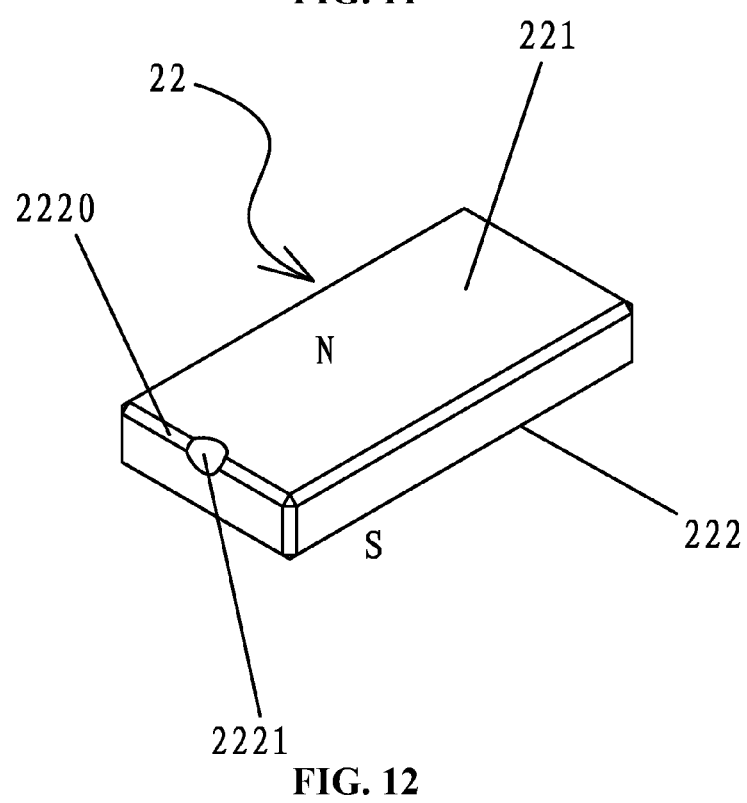
FIG. 12 is a stereogram of a second permanent magnet in accordance with another embodiment of the invention.

The permanent magnet rotor disclosed in this example is basically the same as that in Example 1 except that the first short side 2110 is disposed on the south pole weak magnetic surface 212; and the second short side 2220 is disposed on the north pole weak magnetic surface 221, as shown in FIGS. 11-12.

Principle of the permanent magnet rotor is summarized as follows. The permanent magnets 2 comprise a first permanent magnet 21 and a second permanent magnet 22. The first permanent magnet 21 comprises a north pole strong magnetic surface 211 and a south pole weak magnetic surface 212. The second permanent magnet 22 comprises a north pole weak magnetic surface 221 and a south pole strong magnetic surface 222. The first permanent magnet 21 and the second permanent magnet 22 are alternately disposed in the radial recesses 122. The north pole strong magnetic surface 211 of the first permanent magnet 21 and the north pole weak magnetic surface 221 of the second permanent magnet 22 from two adjacent radial recesses 12 are separately attached to two sides of a same magnetic induction block 11 to form a north magnetic pole; and the south pole weak magnetic surface 212 of the first permanent magnet 21 and the south pole strong magnetic surface 222 of the second permanent magnet 22 from two adjacent radial recesses 12 are separately attached to two sides of another same magnetic induction block 11 to form a south magnetic pole. Thus, the magnetic strengths of the magnetic poles are basically equivalent, the magnetic distribution is uniform, thereby weakening electromagnetic noise and vibration of the running motor. 2) The first permanent magnet comprises a first short side on the top thereof, and a first marker is disposed on the first short side; the second permanent magnet comprises a second short side on the top thereof, and a second marker is disposed on the second short side, so that the permanent magnets can be disposed accurately and rapidly, the misplacement thereof is prevented, thereby improving the working efficiency.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A permanent magnet rotor, comprising: a rotor core and permanent magnets, wherein
   the rotor core comprises a plurality of magnetic induction blocks;
   a plurality of radial recesses are formed between every two adjacent magnetic induction blocks for mounting the permanent magnets;
   the magnetic induction blocks at both sides of an opening of the radial recesses protrude to form hook blocks;
   the permanent magnets comprise a plurality of first permanent magnets and a plurality of second permanent magnets;
   each of the plurality of first permanent magnets comprises a first north pole magnetic surface and a first south pole magnetic surface, and each of the plurality of second permanent magnets comprises a second north pole magnetic surface and a second south pole magnetic surface;
   the magnetic strength of the first north pole magnetic surface is greater than the magnetic strength of the first south pole magnetic surface;
   the magnetic strength of the second north pole magnetic surface is smaller than the magnetic strength of the second south pole magnetic surface;
   the number of the first permanent magnets is equal to the number of the second permanent magnets;
   the plurality of first permanent magnets and the plurality of second permanent magnets are alternately disposed in the radial recesses;
   the first north pole magnetic surface and the second north pole magnetic surface are separately attached to two sides of a same magnetic induction block to form a north magnetic pole; and
   the first south pole magnetic surface and the second south pole magnetic surface are separately attached to two sides of another same magnetic induction block to form a south magnetic pole.

2. The permanent magnet rotor of claim 1, wherein each of the plurality of first permanent magnets comprises a first side, and a first marker is disposed on the first side; each of the plurality of second permanent magnets comprises a second side, and a second marker is disposed on the second side.

3. The permanent magnet rotor of claim 2, wherein the first side is disposed on the first north pole magnetic surface; and the second side is disposed on the second south pole magnetic surface.

4. The permanent magnet rotor of claim 3, wherein the first marker and the second marker are alternately and uniformly disposed.

5. The permanent magnet rotor of claim 4, wherein the magnetic strength of the first north pole magnetic surface is at least 5% greater than that of the first south pole magnetic surface; and the magnetic strength of the second north pole magnetic surface is at least 5% smaller than that of the second south pole magnetic surface.

6. The permanent magnet rotor of claim 1, wherein the rotor core and the permanent magnets are connected via an injection layer.

7. The permanent magnet rotor of claim 6, wherein the injection layer comprises a front end panel, a rear end panel, and a middle connection column connecting the front end panel and the rear end panel.

8. The permanent magnet rotor of claim 2, wherein the first side is disposed on the first south pole magnetic surface; and the second side is disposed on the second north pole magnetic surface.

9. The permanent magnet rotor of claim 2, wherein each of the plurality of first permanent magnets and the first marker, and each of the plurality of second permanent magnets and the second marker, both are integrated.

10. The permanent magnet rotor of claim 3, wherein each of the plurality of first permanent magnets and the first marker, and each of the plurality of second permanent magnets and the second marker, both are integrated.

* * * * *